(12) United States Patent
Lauvdal

(10) Patent No.: US 9,440,828 B2
(45) Date of Patent: Sep. 13, 2016

(54) HOLDING DEVICE TO BE MOUNTED ON A CARRIER AND THE USE OF SUCH A DEVICE

(75) Inventor: Olav Lauvdal, Marnardal (NO)

(73) Assignee: Ugland & Lauvdal AS, Grimstad (NO)

( * ) Notice: Subject to any disclaimer, the term of this patent is extended or adjusted under 35 U.S.C. 154(b) by 0 days.

(21) Appl. No.: 13/264,621

(22) PCT Filed: Apr. 15, 2010

(86) PCT No.: PCT/NO2010/000137
§ 371 (c)(1),
(2), (4) Date: Jan. 30, 2012

(87) PCT Pub. No.: WO2010/120185
PCT Pub. Date: Oct. 21, 2010

(65) Prior Publication Data
US 2012/0119530 A1 May 17, 2012

(30) Foreign Application Priority Data

Apr. 16, 2009 (NO) .................................. 20091494

(51) Int. Cl.
*B66F 9/18* (2006.01)
*B66F 9/19* (2006.01)
*B25J 15/06* (2006.01)

(52) U.S. Cl.
CPC .............. *B66F 9/195* (2013.01); *B25J 15/065* (2013.01); *B66F 9/181* (2013.01); *B66F 9/182* (2013.01)

(58) Field of Classification Search
CPC ........ B66F 9/181; B66F 9/182; B66F 9/195; B25J 15/065; B25J 15/0666
USPC ......... 294/65.5, 183, 185, 65; 414/607, 619, 414/785

See application file for complete search history.

(56) References Cited

U.S. PATENT DOCUMENTS

| 2,970,003 A | * | 1/1961 | Heath, Jr. et al. ............ 294/65.5 |
| 3,257,141 A | * | 6/1966 | Buus et al. ................... 294/65.5 |

(Continued)

FOREIGN PATENT DOCUMENTS

| CN | 1842486 A | 10/2006 |
| DE | 3834311 A1 | 4/1990 |

(Continued)

OTHER PUBLICATIONS

International Search Report from PCT/NO2010/000137 dated Aug. 4, 2010 (4 pages).

(Continued)

*Primary Examiner* — Dean Kramer
(74) *Attorney, Agent, or Firm* — Osha Liang LLP

(57) ABSTRACT

A holding device for lifting and/or moving an article including at least one substantially planar outer surface is designed for mounting on an implement carrier, which includes a carrier part. The holding device can be mounted on, and released from, the implement carrier. At least one holding unit can come into contact with the article and can grip the article by surface contact between the at least one holding unit and one outer surface of the article to be lifted and/or moved. The carrier part includes at least one backstop against which the article can rest when the article is to be released from the at least one holding unit while the at least one holding unit is movably mounted to the carrier part. The holding device also includes at least one actuator for moving the at least one holding unit relative to the at least one backstop.

12 Claims, 5 Drawing Sheets

(56) References Cited

U.S. PATENT DOCUMENTS

| | | |
|---|---|---|
| 6,168,221 B1 | 1/2001 | Carruth et al. |
| 7,967,545 B2 | 6/2011 | Lauvdal |
| 2005/0269827 A1* | 12/2005 | Heard .................. 294/65.5 |

FOREIGN PATENT DOCUMENTS

| | | | |
|---|---|---|---|
| DE | 201 08 552 U1 | 1/2002 |
| EP | 0 192 994 A1 | 9/1986 |
| EP | 1 654 188 B1 | 4/2008 |
| GB | 2 184 603 A | 6/1987 |
| JP | 52-73460 A | 6/1977 |
| JP | 59-131602 U | 9/1984 |
| JP | 3-107498 U | 11/1991 |
| JP | 08-012242 A | 1/1996 |
| JP | 08-175799 A | 7/1996 |
| NO | 324317 B1 | 9/2007 |
| RU | 1785985 A1 | 1/1993 |
| SU | 1527123 A2 | 12/1989 |
| WO | 97/13718 A1 | 4/1997 |
| WO | 2005/000730 A1 | 1/2005 |

OTHER PUBLICATIONS

Written Opinion from PCT/NO2010/000137 dated Aug. 4, 2010 (6 pages).
Response to Written Opinion for PCT/NO2010/000137 dated Mar. 28, 2011 (8 pages).
Norweigan Office Action dated Oct. 25, 2009 (3 pages).
Chinese Office Action for Application No. 201080027025.0, mailed on Sep. 4, 2013 (4 pages).
Office Action in counterpart Japanese Patent Application No. 2012-505844 issued on May 7, 2014 (10 pages).

* cited by examiner

HOLDING DEVICE TO BE MOUNTED ON A CARRIER AND THE USE OF SUCH A DEVICE

BACKGROUND OF INVENTION

The invention relates to a holding device for mounting on an implement carrier such as a forklift truck, hoisting crane, tractor or the like in order to hold, lift or move an article.

Today vast quantities of white goods, i.e., refrigerators, deep freezers, cookers, etc., are sold, and similarly huge numbers of old white goods are collected when consumers replace them by purchasing new white goods because they are defective or are old and do not work properly. Environmental regulations in many countries require that discarded white goods be collected so that environmentally harmful substances found in the white goods can be dealt with in a secure and proper manner. At the same time, a great deal of the materials in the white goods can be recycled. Therefore, large numbers of discarded white goods arrive at white goods collection sites and are tightly stacked on top of one another, and must be capable of being handled in an efficient and careful manner.

From the Applicant's own Norwegian patent, NO 324317 B1, and the corresponding European patent EP 1654188 B1, a device is known for mounting on an implement carrier such as a forklift truck. The devices comprise a carrier part which is slid onto the fork structure of the implement carrier and magnets, which are attached to the carrier part. The holding part has magnets for gripping an article, typically a white goods item, which is to be lifted and/or moved. To release the article from the magnets, a release mechanism is provided, which consists of a release lever that is rotatably secured to the carrier frame. On release of the article, the article is thus pushed a given distance such that the magnetic forces holding the article become so great that the magnetic forces holding the article are broken. However, when several articles are to be stacked on top of one another, or because there often is not room to push the article forwards when it is to be released, the carrier part must be equipped with a telescopic device on the portion of the carrier part that is slid onto the forks of the forklift truck. When the release lever tries to push the article forwards, the whole carrier part is drawn a corresponding distance back towards the forklift truck, thereby releasing the article without it being pushed forwards (it is prevented by the release lever from following the carrier part backwards when it is drawn backwards). This design is complex as the carrier part of the device must have a telescopic fastening device for attachment to a forklift truck. In addition, the telescopic movement must be synchronised with the movement of the release lever.

If the device is not equipped with such a telescopic device, the driver of the forklift truck must reverse the truck because the release lever is used to release the article. This will of course work in a less than satisfactory manner if the driver has difficulty in managing to coordinate and synchronise the truck's (and thus the carrier part's) movement backwards with the movement of the release lever.

SUMMARY OF INVENTION

Therefore, one or more embodiments of the present invention provide a holding device for lifting and/or moving an article, where the holding device is adapted for mounting on an implement carrier.

According to one or more embodiments of the present invention, a holding device is provided for lifting and/or moving an article which comprises at least one substantially plane outer surface, the holding device being designed for mounting on an implement carrier, and which holding device comprises a carrier part including connecting means to allow the holding device to be mounted on the implement carrier and dismounted from the implement carrier; at least one holding unit which is so arranged that the at least one holding unit in a contact position can come into contact with the article and can hold the article by surface contact between the at least one holding unit and a surface on the article to be lifted and/or moved; and wherein the carrier part comprises at least one backstop against which the article can rest when the article is to be released from the at least one holding part; the at least one holding unit is movably mounted to the carrier part so that the at least one holding unit can be moved relative to the at least one backstop; the holding device further comprises at least one actuator for movement of the at least one holding unit relative to the at least one backstop.

According to one or more embodiments of the present invention, the holding device consists primarily of two main parts, a carrier part and at least one holding unit or a holding part having at least one holding unit. The carrier part comprises connecting devices such that the holding device can be mounted to an implement carrier. If the implement carrier is, for example, a forklift truck or a tractor with a loader equipped with forks, the connecting devices may comprise sleeve members which in shape and size are adapted to the forks of the forklift trucks. The sleeve members will be capable of being removably mounted on the carrier part such that they can be replaced. The holding device will thus be usable on different implement carriers, which are equipped with forks that are of a different size. The connecting means may also be quick release fasteners or rapid couplings such that it is not necessary to use implement carriers with forks.

According to one or more embodiments of the present invention, if the implement carrier is a crane, the holding device may comprise a plurality of lifting lugs fastened to the carrier part. Wires, chains or similar means may be fastened to the lifting lugs in order to be able to lift the holding device and move it around. Other connecting devices are also conceivable both for implement carriers of the type mentioned above and for other types of implement carriers.

According to one or more embodiments of the present invention, the connecting devices may also comprise screws, bolts and other suitable fasteners which can be used for fastening the holding device securely to the implement carrier, and which later can be loosened or released to allow the holding device to be removed from the implement carrier when the holding device is not in use. Alternatively, if the implement carrier is not to be used for other purposes, the holding device can be fastened permanently to the implement carrier, for example, by means of welding, riveting or other suitable methods of a more permanent character.

According to one or more embodiments of the present invention, the carrier part comprises at least one backstop that is fixedly mounted or secured to the carrier part and against which the article can rest when the article is to be released from the holding device. The backstop may be an integral part of the carrier part, for example, in the form of a frame which is secured to the carrier part. The backstop may also be constituted of one or more beams that are fastened to the carrier part against which the article to be lifted and/or moved may rest. The beam or beams may be oriented in a substantially vertical or a substantially horizontal direction. According to one or more embodiments of the present invention, backstop comprises one or more surfaces facing the article to be lifted and/or moved, and lies preferably in a surface corresponding to the shape of the surface of the article to be lifted and/or moved, for example, a plane surface, a partially cylindrical surface or other types of curved surfaces.

According to one or more embodiments of the present invention, the at least one holding unit or the at least one holding part is mounted on the carrier part so as to be movable relative to the backstop. The at least one holding unit or at least one holding part may be movably mounted to the actual backstop, for example, if the backstop is constituted of a frame. The at least one holding unit or the at least one holding part may of course also be mounted to other portions of the carrier part, as long as the at least one holding unit or the at least one holding part is movably mounted relative to the backstop.

According to one or more embodiments of the present invention, the at least one holding part may be configured with a frame in which there is mounted at least one holding unit which is so positioned that it comes into contact with the article that is to be lifted and/or moved when the holding part is placed in a contact position. In practice, this means that the at least one holding unit lies in a surface (for example, in a plane), which is, according to one or more embodiments of the present invention, flush with or slightly ahead of the surface in which the backstop lies, so that the at least one holding unit projects slightly beyond the surface in which the at least one backstop lies, but it is also possible to place the at least one holding unit slightly behind this surface as long as the holding unit exerts sufficient force to hold the article that is to be lifted and/or moved. Thus, it is ensured that the at least one holding unit comes into contact with the article to be lifted and/or moved. The frame, or frames if the holding device is equipped with two or more holding parts, is mounted to the carrier part so as to be movable in relation to the at least one backstop.

According to one or more embodiments of the present invention, the at least one holding unit is designed so as to be capable of holding the article that is to be lifted and/or moved by means of surface contact between the at least one holding unit and a surface of the article. It is important to stress that pincer or tong-like devices are out of the question because these may easily damage the article to be lifted and/or moved. Tong-like devices will also require available space at the sides of the article or above and below the article so that the two parts of the jaw of the tong-like device can be moved into place on opposite sides of the article prior to the tong-like device clamping around the article. Sufficient space at the sides of the article will often not be available and a tong-like device will thus be difficult to use.

According to one or more embodiments of the present invention, the at least one holding unit may comprise at least one magnetic element. The magnetic element will provide the type of surface contact between the at least one holding unit and a surface of the article as mentioned above. This magnetic element may be a permanent magnet or an electromagnet. According to one or more embodiments of the present invention, holding units including one or more magnets are well-suited when at least the surface of the articles that comes into contact with the holding unit or units is made of a magnetisable material, as, for instance, white goods.

According to one or more embodiments of the present invention, the at least one holding device may alternatively comprise a suction cup element. The suction cup element is connected by means of a hose, a tube, or the like to a vacuum pump which generates a vacuum inside the suction cup element when the suction cup element is placed against a surface of the article to be lifted and/or moved, and thus provides a force sufficient to hold the article so that it can be lifted and/or moved.

According to one or more embodiments of the present invention, the holding units may be arranged on the holding part so as to lie in an imaginary surface, which corresponds to the shape of the outer surface of the article to be lifted and/or moved and with which the holding units come into contact. This surface may be substantially planar, as is the case for most types of white goods, or possibly curved if the article has a curved outer surface.

According to one or more embodiments of the present invention, the at least one holding part is mounted to the holding device carrier part so as to be movable relative to the backstop. If the at least one holding part includes a holding frame with one or more holding units, the holding frame can be secured movably to the carrier part. At the same time, the holding part can be arranged and secured in a holding position in which the holding units can exert a force on an outer surface of the article to be lifted and/or moved that is sufficiently large to hold the article.

According to one or more embodiments of the present invention, the at least one holding unit or the at least one holding part may be rotatably fastened to the carrier part. The at least one holding unit or the at least one holding part will then function in the same way as a window or a flap that can swing back and forth or up and down depending on whether the at least one holding unit or the at least one holding part is fastened in such a way that the rotational axis of the at least one holding unit or the at least one holding part is horizontal or vertical. If the holding device is equipped with a plurality of gripping devices, one or more of the gripping devices or holding parts may of course have a horizontal axis of rotation, whilst one or more of the gripping devices or holding parts may at the same time have a vertical axis of rotation.

In the holding device according to one or more embodiments of the present invention, the at least one holding unit or the at least one holding part may be arranged so as to be movable in a linear or curved path, i.e., all points on the at least one holding unit or the at least one holding part follow approximately the same path when they move between a contact position and a release position. The holding device can, if so desired, be equipped with guides which the at least one holding unit or the at least one holding part can follow when they are moved in relation to the at least one backstop. The guide or guides may also support or at least partly support the at least one holding unit or the at least one holding part, which may be advantageous, in particular if the at least one holding unit or the at least one holding part is of high weight.

According to one or more embodiments of the present invention, the holding device is further equipped with at least one actuator that is mounted to the at least one holding unit or the at least one holding part and to the carrier part or the implement carrier such that the at least one holding unit or the at least one holding part can be moved. The at least one actuator may, for example, be constituted of a piston and cylinder arrangement, which is hydraulically or pneumatically operated, or it may be driven by an electric motor. If the holding device is equipped with several actuators, which may be necessary if the holding device is equipped with two or more holding units or holding parts, the actuators will be arranged so as to be moved synchronously, if necessary with the aid of a control unit which controls the movements of the individual actuators. If, for example, the actuators are hydraulically or pneumatically operated, this will typically be done by controlling valves which regulate the supply of hydraulic or pneumatic fluid to the actuators.

According to one or more embodiments of the present invention, the actuator may be configured as a manual actuator such that the at least one holding unit or the at least one holding part is moved without the aid of hydraulic, pneumatic, electric or other means, which may provide a force for movement of the at least one holding unit or the at least one holding part. An actuator of this kind may, for example, comprise cord, wire or the like that is fastened to the at least one holding unit or the at least one holding part at one end thereof and a lever, rod or the like at the other end. The lever can be mounted on the carrier part of the holding device or on the implement carrier. The holding device may further be equipped with one or more spring devices, which are fastened to the at least one holding part or the at least one holding unit and to the carrier part or the at least one backstop such that the spring device forces the at least one holding part or the at least one holding unit into the contact position when there is no pull on the wire. By pulling on or turning the lever, the at least one holding unit or the at least one holding part is drawn back relative to the at least one backstop.

According to one or more embodiments of the present invention, the holding device may be provided with one or more holding parts, which are equipped with at least one holding unit, or alternatively, the at least one holding unit may be mounted on the holding device so as to be movable relative to the at least one backstop. According to one or more embodiments of the present invention, the at least one holding unit may be rotatably fastened to the carrier part or the at least one backstop with the aid of a hinge device or the like.

According to one or more embodiments of the present invention, the at least one holding unit or the at least one holding part can be mounted directly on the actuator so that a movement of the actuator gives a direct movement of the at least one holding unit or the at least one holding part. If the actuator comprises one or more piston and cylinder arrangements, the at least one holding unit or the at least one holding part can be mounted to the piston or pistons such that the at least one holding unit or the at least one holding part can be moved back and forth relative to the at least one backstop by moving the piston or pistons back and forth in the cylinder or cylinders. If the holding device is equipped with two or more actuators, in the form of piston and cylinder arrangements, the actuators, as mentioned above, will be arranged so that they are moved synchronously, for example, with the aid of a control unit that controls the movements of the individual actuators.

According to one or more embodiments of the present invention, when an article is held by the holding device, it can be released by allowing the actuator or actuators to move the at least one holding unit or the at least one holding part backwards and away from the article that is held. The article will rest against the at least one backstop, which thus prevents the article from following the backward movement of the at least one holding unit or the at least one holding device. When the backward force of the actuator is sufficiently large, the forces between the at least one holding unit or the at least one holding part and the article are broken and the article is thus released from the holding device without the article having moved and without the implement carrier or the carrier part of the holding part having moved to any appreciable degree (some movement may occur because the thin plates of which the outer surface of the article is made may move slightly).

According to one or more embodiments of the present invention, the at least one holding part, as mentioned, may comprise at least one holding part frame movably mounted to the holding device. If the at least one holding part is rotatably mounted to the carrier part, according to one or more embodiments of the present invention, the at least one holding part is rotatable about an axis that is substantially parallel to the surface of the at least one backstop which faces the article to be lifted or moved.

According to one or more embodiments of the present invention the carrier part of the holding device may also comprise a supporting edge, which is fixedly or removably mounted at the lower edge of the carrier part for support of the article that is to be lifted and/or moved. The supporting edge may optionally be mounted so as to be movable back and forth relative to the carrier part so that the article can first be lifted a little, whereupon the supporting edge is moved in under the article. The supporting edge may also comprise side edges for lateral support of the article that is to be lifted and/or moved.

Embodiments of the present invention are well suited for use on, for example, a forklift truck or a tractor that is equipped with lifting gear having forks as on a forklift truck, the holding device then being designed for mounting on a forklift truck or the tractor lifting gear. Embodiments of the present invention may also be used with a crane or the like, the holding device then being designed for mounting on the crane.

BRIEF DESCRIPTION OF THE DRAWINGS

Embodiments of the present invention will be described below with reference to the attached figures, wherein.

DETAILED DESCRIPTION OF INVENTION

It should be stressed that all the figures are schematic and that only the aspects of the invention that are necessary to be able to understand its mode of operation have been included in the figures. It should also be stressed that the extent of movement of the at least one holding part or the at least one holding unit between a contact position and a release position has been exaggerated in the figures in order to illustrate more clearly the mode of operation of the holding device. The embodiments of the holding device 10 which are shown in the examples below are designed to lift and/or move articles where an article that is to be lifted and/or moved is held with the aid of magnetic force.

Figure 1:
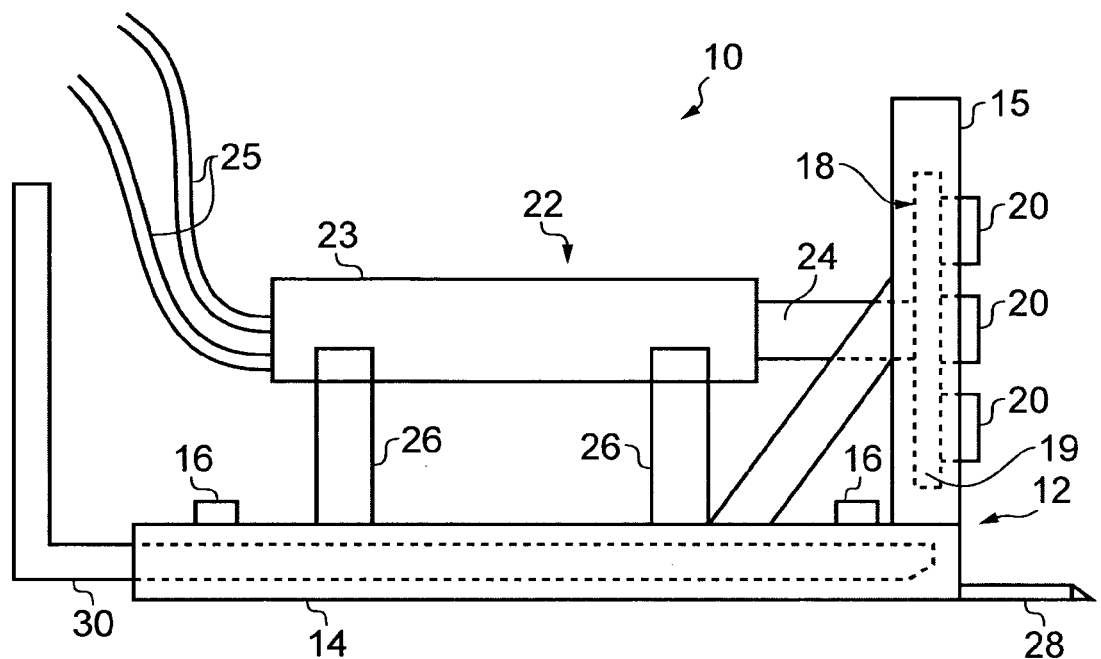
FIG. 1 is a schematic side view of a holding device where the holding part is in a contact position.
Figure 2:
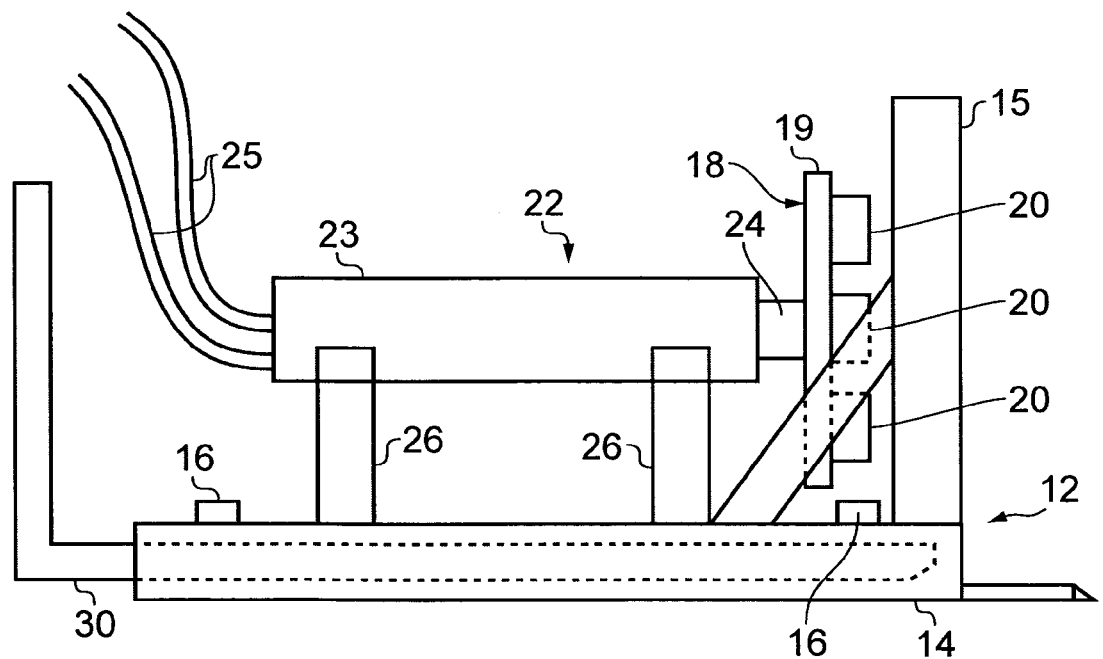
FIG. 2 is a schematic side view of a holding device where the holding part is in a release position.
Figure 3:
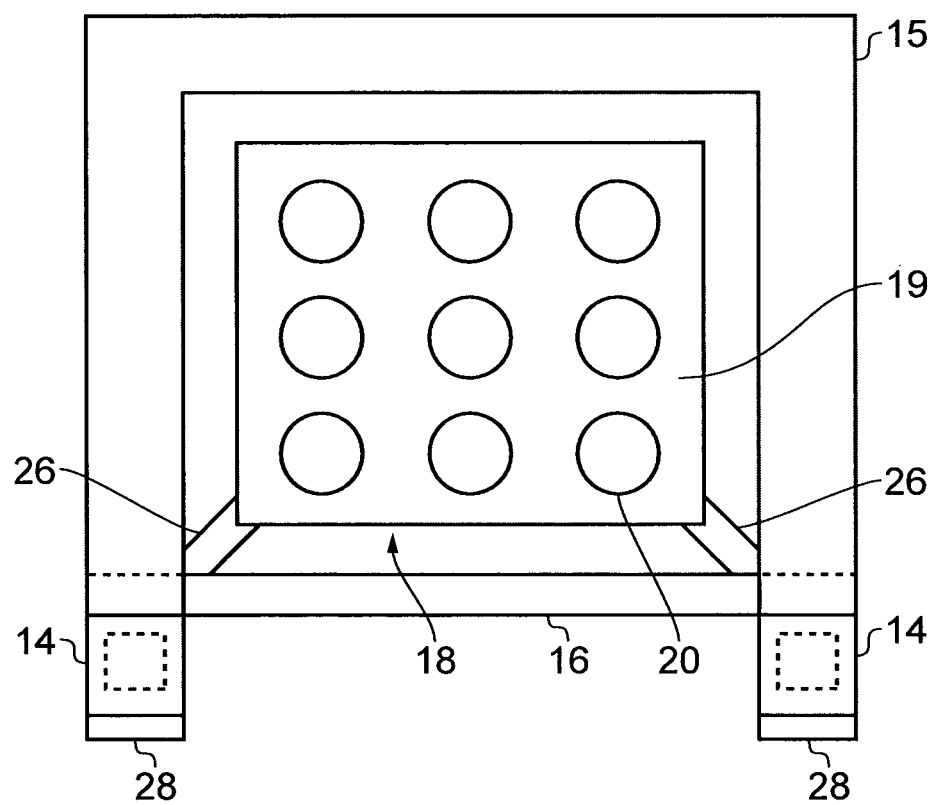
FIG. 3 is a schematic front view of the holding device shown in FIGS. 1 and 2.

FIGS. 1-3 show an embodiment of the holding device 10, which is designed for mounting on an implement carrier that is equipped with forks, as, for instance, a forklift truck.

The illustrated embodiment of the holding device 10 comprises a carrier part 12, a holding part 18, and an actuator 22 for movement of the holding part 18 in a substantially rectilinear movement.

The carrier part 12 comprises sleeve members 14, which are so arranged that the forks 30 of the forklift truck can be inserted into the sleeve members 14. According to one or more embodiments of the present invention, the sleeve members also comprise fastening means (not shown in the figures) for secure attachment of the carrier part 12 to the forklift truck. There may, for example, be screw members that are screwed into the forks 30 or clamped to the forks to prevent the carrier part 12 from sliding off the forks 30 when the holding device 10 is in use. Other types of fastening devices may also conceivably be used. According to one or more embodiments of the present invention, the carrier part 12 is permanently fastened to the forklift truck or another implement carrier if the forklift truck or the implement carrier is only to be used together with the holding device 10. This may, for example, be done by means of welding.

At one end of the sleeve members 14, a backstop 15 is mounted, which projects upwards substantially perpendicular to the sleeve members 14. According to one or more embodiments of the present invention, the backstop 15 is configured as a U-shaped frame that is arranged upside down on the sleeve members 14 and where the legs of the U are fastened to the sleeve members 14 by means of, for example, welding. A plurality of stiffeners 16 may be arranged between the sleeve members 14, if necessary.

The holding part 18 comprises a holding frame 19 and one or more holding units 20. The holding frame 19 may be a frame that is configured such that the desired number of holding units 20 can be secured to the frame. The holding frame 19 may optionally include a plate to which the holding units 20 may be secured. In FIG. 3, it is shown that the holding part 18 is provided with nine holding units.

According to one or more embodiments of the present invention, as shown in FIGS. 1-3, the holding units 20 comprise magnetic elements. When the holding part 18 and the holding units 20 are in a contact position, the holding units 20 project slightly further forward than the backstop 15, and this ensures that the holding units 20 come in contact with an outer surface of the article to be lifted or moved when the holding device 10 is moved close up to the outer surface of the article. According to one or more embodiments of the invention, this distance will be as small as possible so that the article to be lifted and/or moved is held as close to the backstop 15 as possible during lifting and/or moving of the article. The holding units 20 may conceivably also be flush with, or slightly behind, the plane formed by the backstop 15 against which the article rests when the article is to be released from the holding device 10, as long as the magnetic elements of the holding units 20 are capable of providing sufficient holding power to hold the article that is to be lifted and/or moved.

The magnetic elements can be mounted directly on the holding frame 19 with the aid of screws, bolts or other suitable fasteners. Alternatively, one or more holding elements (not shown in the figures) may be used and can be mounted on the holding frame 19. Such a holding element may, for example, consist of an encircling box element having an inner space that is adapted to the size and shape of the magnetic elements. At its ends, the holding element may be configured with flanges; one flange with holes for mounting to the holding frame 19 at one end, and a flange that is adapted to a groove in the surface of the magnetic element at the other end. The groove in the surface of the magnet must be at least as deep as the thickness of the flange so that the magnet surface can come into contact with an outer surface of the article that is to be lifted and/or moved.

The holding part 18 is fastened or connected to an actuator 22. According to one or more embodiments of the present invention as shown in FIGS. 1-3, the actuator 22 comprises a cylinder 23 and a piston rod 24. The holding part 18 is fastened to the piston rod 24 in such a way that the holding part 18 can be moved back and forth relative to the backstop 15. The actuator 22 may be hydraulically or pneumatically operated and is supplied with hydraulic fluid or air through fluid lines 25 via a suitable unit for pressurising the hydraulic fluid or the air (not shown in the figures). The supply of fluid through the fluid lines 25 can be controlled by the driver of the implement carrier.

According to one or more embodiments of the present invention as shown in FIGS. 1-3, the cylinder 23 is fastened or mounted to the carrier part by means of cylinder supports 26 that can be fastened to the sleeve members 14 or, optionally, the stiffeners 16 or similar elements that are arranged between the sleeve members 14. As appreciated by one of ordinary skill in the art, there are also other ways of fastening the actuator 22 to the carrier part. How the attachment is effected will inevitably depend upon how the carrier part is constructed, which can of course be done in a number of ways.

In FIG. 1, the holding device 10 is shown in a contact position. In this position, an article that is to be lifted and/or moved can be held with the aid of the holding units 20. When the article has been lifted or moved to the desired position, the holding part 18 with the holding units 20 can be retracted into a release position by actuating the actuator. The release position is shown clearly in FIG. 2. When the holding part 18 is retracted, the outer surface of the article with which the holding units 20 are in contact, will come to rest against the backstop 15 and the article is prevented from following the holding part 18 backwards. The holding force between the holding units 20 and the outer surface of the article is broken and the article is released from the holding device 10.

FIGS. 1-3 also show that the carrier part 14 of the holding device can be provided with supporting members 28 for support of the article to be lifted and/or moved. In FIG. 3, it is shown that one supporting member 28 can be attached to each sleeve member 14, where the supporting members 28 have substantially the same width as the sleeve members 14. Of course, it is also possible to provide a single supporting member 28 that extends between the sleeve members 14, either at the lower edge of the sleeve members 14 or so that the supporting members 28 lie in the same plane as the underside of the sleeve members 14.

Figure 4:
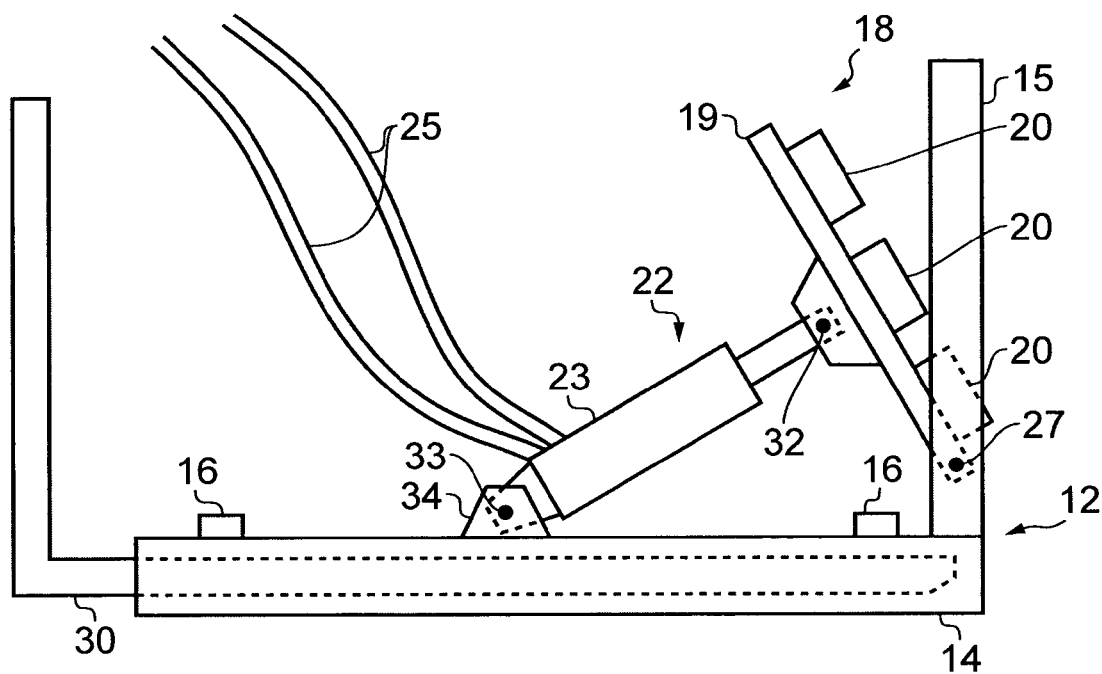
FIG. 4 is a schematic side view of a holding device where the holding part is in a release position.

According to one or more embodiments of the present invention, as shown in FIG. 4, the holding part 18 of the holding device 10 is rotatably fastened to the carrier part 12 so that the holding part 18 can be moved relative to the backstop 15. The actuator 22 according to one or more embodiments of the present invention is, at one end thereof, rotatably fastened to a supporting member 34 by means of a rotary member 33. The rotary member may be a bolt, a shaft or other suitable fasteners. The supporting member 34 is fastened to the carrier part 12, for example, a stiffener (not shown in the figure) which extends between the sleeve members 14. Alternatively, there may be provided a supporting member 34 on each sleeve member 14 and a rotary member 33, which extends between the supporting members 34 and to which the cylinder 23 is attached. At its other end, the actuator 22 is rotatably fastened to the holding part 18 with the aid of a rotary member 32. Other parts according to one or more embodiments of the present invention have been described in connection with one or more embodiments as shown in FIGS. 1-3, and will not be repeated here.

In FIG. 4, the holding device 10 is shown in a release position. When the holding part 18 is moved into the contact position, the holding part 18 is rotated about one or more rotary members 27 by the actuator 22. The rotary member or members 27 may be a shaft, bolts or other suitable devices, which permit the holding part 18 to rotate in relation to the backstop 15.

Figure 5:
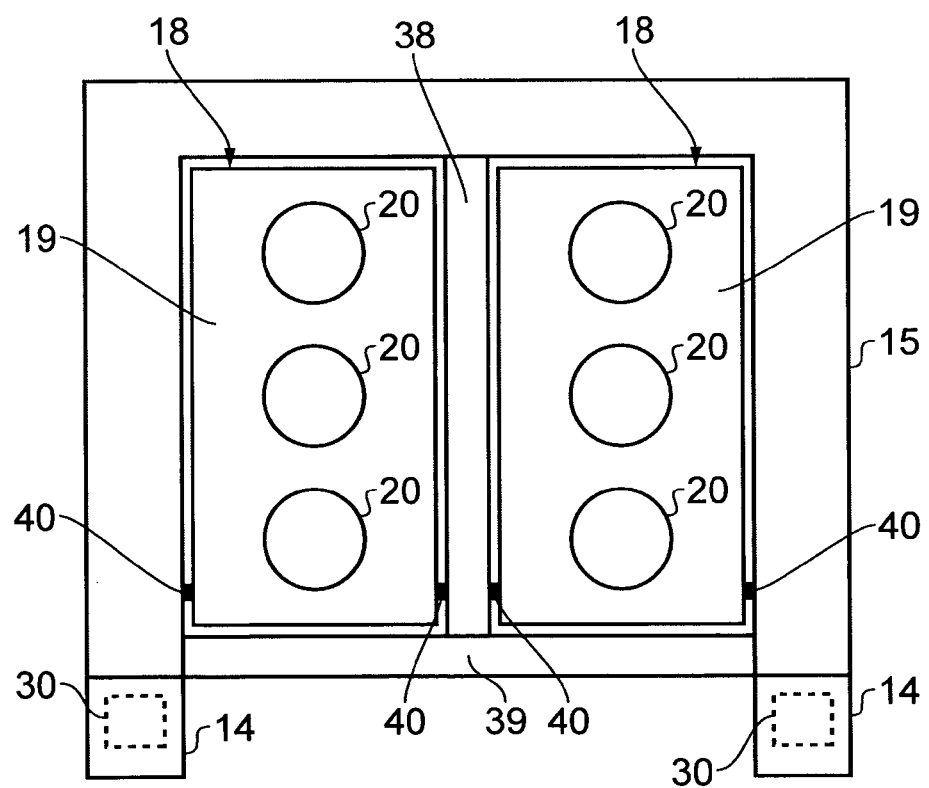
FIG. 5 is a schematic front view of a holding device with two holding parts.

According to one or more embodiments of the present invention, FIG. 5 shows an embodiment that is a variant of the embodiment shown in FIG. 4. The backstop 15, which is formed of a U-shaped frame as explained above, and which is fastened to the sleeve members 14, is in the embodiment shown in FIG. 5 supplemented with two beams 38, 39, which also function as a backstop for the article that is to be lifted and/or moved.

The beam 39 extends between and is fastened to the two legs of the U-shaped frame, whilst the beam 38 extends between the upper, substantially horizontal part of the U-shaped frame and the beam 39. Two openings are thus formed in the backstop 15, and in these openings, two holding parts 18 are rotatably arranged with the aid of a rotary member or members 40. The rotary member or members 40 may be a shaft, bolts or other suitable devices that permit the holding parts 18 to rotate in relation to the backstop 15.

In the embodiment shown in FIG. 5, the U-shaped backstop 15 and the beam 39 form an opening having a substantially rectangular form, whilst the beam 38 splits the rectangular opening into two substantially identical openings. The size and shape of the U-shaped frame and the location of the beams 38, 39 may of course vary depending on the demands made on the individual holding device 10, and the frame may also be given other shapes than a U-shape.

The two holding parts 18 are moved by two separate actuators, which may be arranged in the same way as the actuator described in connection with the embodiment shown in FIG. 4 such that each of the two holding parts 18 is fastened to its respective actuator. Alternatively, two separate actuators may be provided in a way similar to that shown in FIGS. 1 and 2 such that the two holding parts 18 are given a substantially rectilinear movement between the contact position and the release position. In such an embodiment, the two holding parts are mounted on their respective actuators and the rotary members 40 will not be present.

The other parts of the embodiment have already been described in connection with the other embodiments of the invention, and will not be repeated here.

Figure 6:
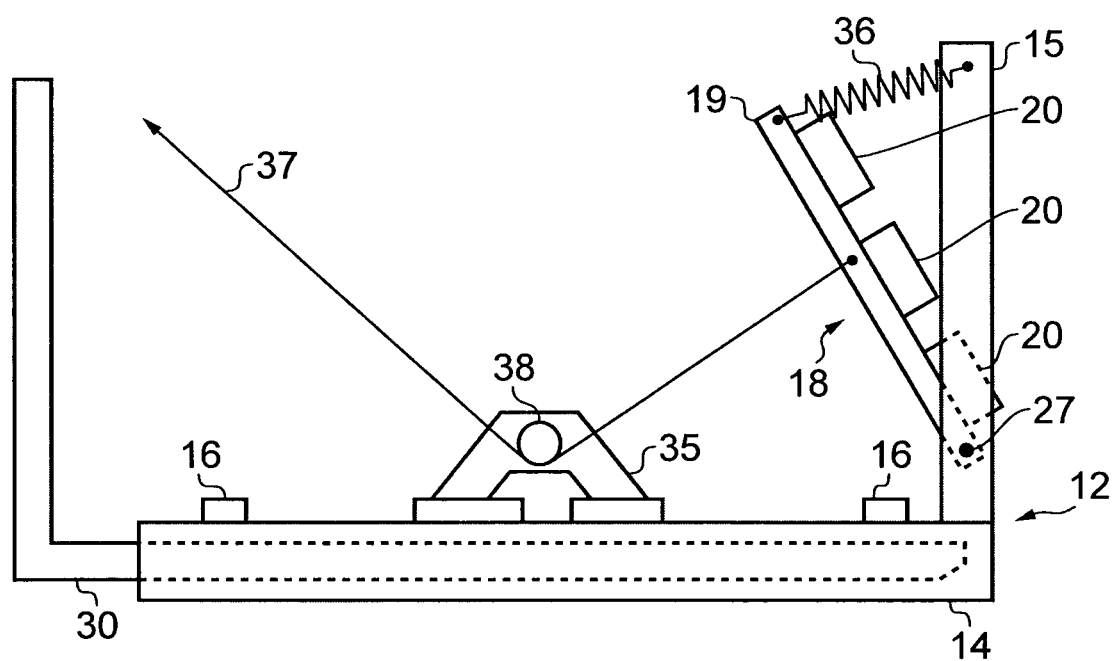
FIG. 6 is a schematic side view of a holding device where the holding part is in a release position.

According to one or more embodiments of the present invention, FIG. 6 shows an embodiment of the invention where the holding part 18 is moved relative to the backstop 15 with the aid of a manual mechanism. The holding part 15 is rotatably fastened to the backstop 15 in the same way as described above in connection with the embodiment shown in FIG. 4. A cord 37 or a wire or the like is fastened to the holding part 18. The other end of the cord 37 is fastened to a lever, handle or the like (not shown in the figures), which the driver of the implement carrier can manipulate. The cord 37 may optionally be run over a wheel 38 that is supported in a supporting member 35. The supporting member 35 may be fastened to the carrier part 12 in the same way as the supporting member 34 in the embodiment shown in FIG. 4.

According to one or more embodiments of the present invention, the holding device shown in FIG. 6 may further be provided with at least one spring body that is arranged so as to exert a force on the holding part 18 in the direction of the contact position of the holding part 18. This spring body may be a coil spring 36 that is fastened to the holding part 18 at one end and to the backstop 15 at the other end. Alternatively, the rotary members 27 may be configured as torsion springs or a torsion spring may be arranged around the rotary members 27.

The other technical features of the embodiment in FIG. 6 have already been described above in connection with the other embodiments of the invention, and will not be repeated here.

When an article is to be lifted or moved, the holding part 18, if this has not already been done, is put in the contact position in that the driver of the implement carrier releases the lever to which the line 37 is attached such that the at least one spring element 36 can pull the holding part 18 into the contact position. When the article has been lifted and optionally moved to the desired position, the driver of the implement carrier pulls on the line 37 and the holding part 18 is thus pulled back and the article is released from the holding units 20 of the holding part 18.

Figure 7:
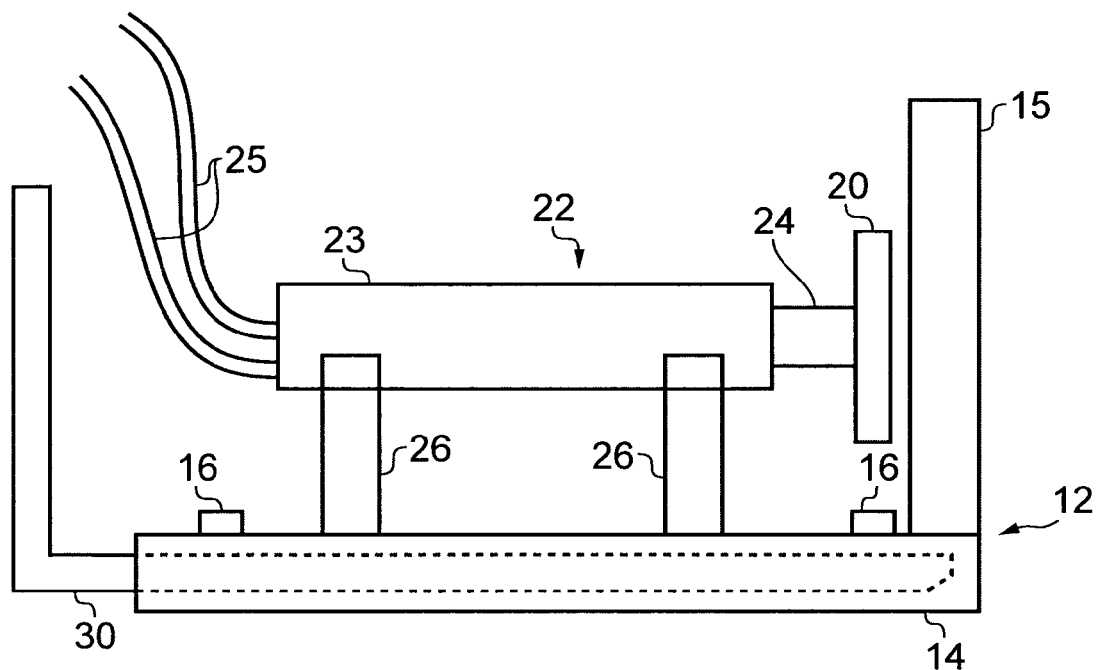
FIG. 7 is a schematic side view of a holding device where the holding unit is in a release position.
Figure 8:
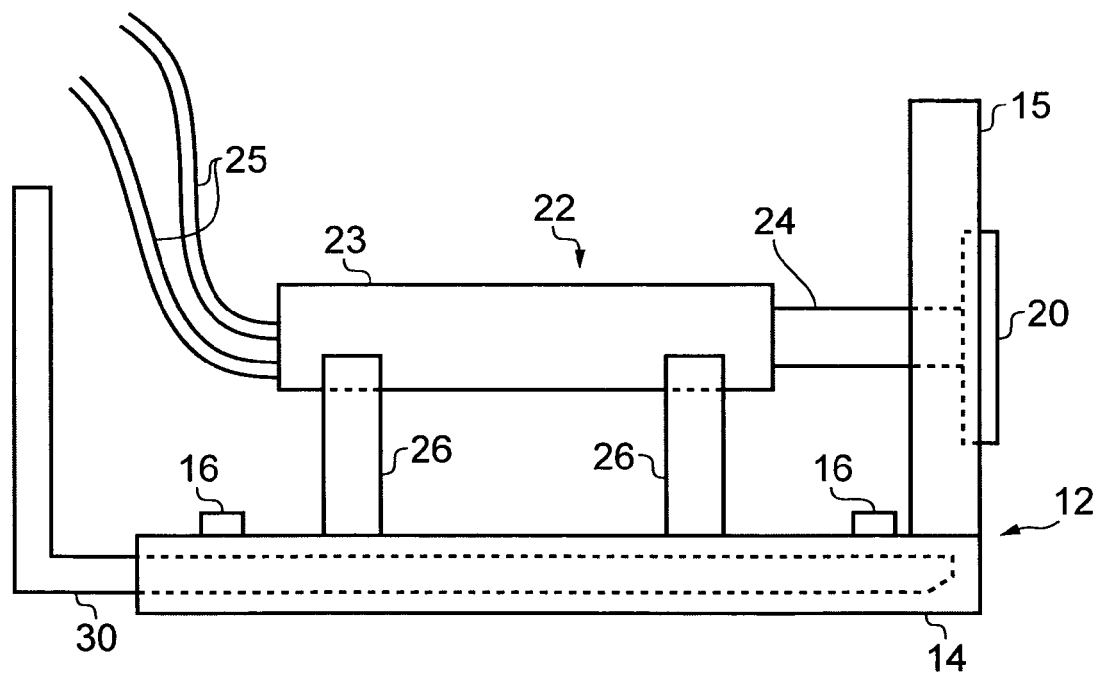
FIG. 8 is a schematic side view of a holding device where the holding unit is in a contact position.

According to one or more embodiments of the present invention, FIGS. 7 and 8 show a simplified embodiment of the invention that is depicted in FIGS. 1-3. In the embodiment shown in FIGS. 7-8, the holding device 10 comprises a holding unit 20 that is mounted directly on the piston rod 24 of the actuator 22 with the aid of suitable fasteners such as screws, bolts or the like. Alternatively, the holding unit 20 is permanently fastened to the piston rod 24 by means of, for example, welding. The holding unit 20, as is the case in the other exemplary embodiments described above, may quite simply comprise a magnetic element, either a permanent magnet or an electromagnet. Alternatively, the holding unit may comprise a magnetic element, which can be fastened to a holding element or the like that in turn may be fastened to the piston rod 24. One way of configuring such a holding element is described above in connection with the embodiment shown in FIGS. 1-3, but many other ways of configuring a holding element that can be used to fasten the magnet to the piston rod are conceivable.

It will also be possible to provide the holding device 10 with two or more actuators 22, each with their respective holding unit 20 mounted in the same way as shown in FIGS. 7-8. According to one or more embodiments of the present invention, the actuators may be arranged adjacent to each other as in the embodiment of the invention shown in FIG. 5.

The other technical features of the embodiment in FIGS. 7-8 have been described above in connection with the other embodiments of the invention, and will not be repeated here.

It should now be obvious that FIG. 8 shows the holding device 10 in contact position. By drawing back the holding unit 20, the article held by the holding unit 20, will come to rest against the backstop 15, the contact force between the holding unit 20 and the article will ultimately be broken, thereby releasing the article from the holding device 10.

It should be stressed that the distance the holding elements 20 project forward of the backstop 15 in the figures is somewhat exaggerated to make it clear that the holding units 20 come into contact with the article to be lifted and/or moved. In reality, this distance will be made as small as possible so that the article to be lifted and/or moved lies as snugly against the backstop 15 as possible when the article is lifted and/or moved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A white goods holding device for lifting and/or moving a white goods article comprising at least one substantially planar and upright outer surface, the holding device being adapted for mounting on a lifting vehicle, the holding device comprising:
 a carrier part comprising non-telescopic connecting devices such that the holding device can be mounted on the lifting vehicle and released from the lifting vehicle; and
 at least one holding part to which a plurality of holding units are secured such that the plurality of holding units, in a contact position, lie in a substantially planar and vertical plane and in said contact position can come into contact with said upright outer surface of the white goods article and can hold the article by surface contact between the plurality of holding units and one outer surface of the white goods article to be lifted and/or moved,
 wherein the carrier part comprises at least one backstop against which the white goods article can rest when the article is to be released from the plurality of holding units, the at least one backstop being mounted to the carrier part,
 wherein the at least one holding part is movably mounted to the holding device so that the plurality of holding units can be moved relative to the at least one backstop,
 wherein the holding device comprises at least one actuator for movement of the at least one holding part relative to the at least one backstop,
 wherein the at least one actuator is a hydraulically or pneumatically operated actuator, and
 wherein the at least one actuator at one end thereof is fastened to the holding part and at another end thereof is fastened to the carrier part or to the lifting vehicle.

2. A white goods holding device according to claim 1, wherein the at least one holding part is rotatably mounted to the carrier part.

3. A white goods holding device according to claim 1, wherein the at least one holding part is mounted to the carrier part so as to enable the at least one holding part to be moved in relation to the backstop in a curved or a substantially rectilinear movement.

4. A white goods holding device according to claim 1, wherein the at least one holding part comprises at least one holding part frame that is movably mounted to the carrier part, and wherein the plurality of holding units is provided in the at least one holding part frame.

5. A white goods holding device according to claim 1, wherein the at least one holding unit comprises a magnetic element.

6. A white goods holding device according to claim 1, wherein the carrier part comprises at least one supporting edge for supporting the white goods article that is to be lifted or moved.

7. A white goods holding device for lifting and/or moving a white goods article comprising at least one substantially planar and upright outer surface, the holding device being adapted for mounting on a lifting vehicle, the holding device comprising:
 a carrier part comprising non-telescopic connecting devices such that the holding device can be mounted on the lifting vehicle and released from the lifting vehicle; and
 at least one holding part to which a plurality of holding units are secured such that the plurality of holding units, in a contact position, lie in a substantially planar and vertical plane and in the contact position can come into contact with the upright outer surface of the white goods article and can hold the article by surface contact between the plurality of holding units and one outer surface of the white goods article to be lifted and/or moved,
 wherein the carrier part comprises at least one backstop against which the white goods article can rest when the article is to be released from the plurality of holding units, the at least one backstop being mounted to the carrier part,
 wherein the at least one holding part is movably mounted to the holding device so that the plurality of holding units can be moved backwards and forwards relative to the at least one backstop,
 wherein the holding device comprises at least one actuator that effects the movement backwards and the movement forwards of the at least one holding part relative to the at least one backstop, and
 wherein the at least one actuator includes a first end fastened to the at least one holding part and a second end fastened to the carrier part or adapted to be fastened to the lifting vehicle.

8. The white goods holding device according to claim 7, wherein the at least one backstop is arranged such that the upright outer surface of the white goods article rests against the at least one backstop when the white goods article is to be released from the plurality of holding units.

9. The white goods holding device according to claim 7, wherein the at least one holding part is rotatably mounted to the carrier part.

10. The white goods holding, device according to claim 7, wherein the at least one holding part is mounted to the carrier part so as to enable the holding part to be moved in relation to the backstop in a substantially rectilinear motion.

11. The white goods holding device according to claim 7, wherein the at least one holding unit comprises a magnetic element.

12. The white goods holding device according to claim 7, wherein the carrier part comprises at least one supporting edge for supporting the article that is to be lifted or moved.

* * * * *